(12) United States Patent
West

(10) Patent No.: X7369
(45) Date of Patent: Jan. 11, 1833

(54) CHLORINE, COSMETIC

(76) Inventor: David West

David West. Columbia Co. N York

Letters Patent

The Schedule referred to in these Letters Patent and making part of the same containing a description in the words of the said David West himself of his improvement being a composition of matter denominated Chlorine Cosmetic To all to whom these presents shall come:

Be it known that I David West of the City of Hudson in the County of Columbia and State of New York have invented a new and useful composition of matter and that the following is a full and exact description of the mode of compounding and the object and operation thereof as invented by me The composition of matter is made by chemically combining uniting or infusing Chlorine gas with and into Oils using gums Animal fats or either of them and which is done first by mixing and grinding or rubbing together the Chloride of lime or chloride of Soda with the said Oils using gums animal fat or either of them so as to form a soft liniment, ointment paste or cosmetic or Secondly it may be done by charging Oils or animal fat with Chlorine gas by means of a retort [illegible] it [illegible] be done [illegible] charging or infusing into water Chlorine gas by means of a retort and mixing the water so charged or infused with oils animal fat or either of them shaking and stirring them together and then suffering the water to settle leaving the Chlorine gas in the oils or animal fat. — The best mode of making the composition is by mixing four ounces of Olive oil with four ounces of Chloride of Lime. The object of the composition of matter is to heal & cure tetters, sores, pimpled faces, ring worms, itch, salt rheum & cutaneous diseases of every description either on man or beast. The composition possessing very powerful antiputrescent qualities In order to secure to the composition its full medicinal & healing virtues I deem the following the best mode of preparing it — take four ounces of Chloride of lime & four ounces of olive oil add to the oil before mixing it with the chloride of lime four ounces of the ointment of the nitrate of quicksilver in order to give the composition an additional curative quality. then add one ounce of the oil of turpentine or of any other essential oil to give
the composition a soft consistence then add a half an ounce of the essence
of Bergamot or any other aromatic essential oil to give the composition a
perfume. Then grind or rub all these articles together until the composition
is of a soft and uniform consistence —
The proportion or quality of the particular articles may be altered or varied
care being taken to preserve the chlorine gas. that being the essential ingre
dient in the Composition Witnesses
Daniel Peck
H C Meingle David West.

444 [illegible]

Exd
Ch.M.